United States Patent [19]

French et al.

[11] Patent Number: 4,864,643
[45] Date of Patent: Sep. 5, 1989

[54] RADIO TRANSMISSION SYSTEM PROVIDING ADJACENT CHANNEL AND IMAGE FREQUENCY REJECTION

[75] Inventors: Richard C. French, Stansted; Christopher B. Marshall, Horley, both of England

[73] Assignee: U.S. Philips Corp., New York, N.Y.

[21] Appl. No.: 880,398

[22] Filed: Jun. 30, 1986

[30] Foreign Application Priority Data

Jul. 8, 1985 [GB] United Kingdom ............... 8517229

[51] Int. Cl.$^4$ ............................................. H04B 1/10
[52] U.S. Cl. .................................... 455/302; 455/304; 455/306
[58] Field of Search ....................... 455/49, 50, 52, 103, 455/302, 317, 260, 258, 323, 325, 326, 327, 303, 304, 306; 370/69.1; 328/167; 307/512, 520, 521

[56] References Cited

U.S. PATENT DOCUMENTS

| | | | |
|---|---|---|---|
| 2,572,235 | 10/1951 | Young, Jr. ............................. | 455/50 |
| 2,640,193 | 5/1953 | Carter et al. ......................... | 370/69.1 |
| 2,895,009 | 7/1959 | Busignies ............................. | 455/49 |
| 3,624,513 | 11/1971 | Costas ................................. | 455/315 |
| 3,961,172 | 1/1976 | Hutcheon ............................. | 455/304 |
| 4,408,351 | 10/1983 | Maurer et al. ....................... | 455/258 |
| 4,584,715 | 4/1986 | Baars et al. ......................... | 455/302 |
| 4,696,055 | 9/1987 | Marshall .............................. | 455/302 |
| 4,731,875 | 3/1988 | Mizukami et al. .................... | 455/327 |

FOREIGN PATENT DOCUMENTS 0124949 11/1984 Fed. Rep. of Germany ...... 455/327

Primary Examiner—Robert L. Griffin
Assistant Examiner—Curtis Kuntz
Attorney, Agent, or Firm—Thomas A. Briody; Algy Tamoshunas; Leroy Eason

[57] ABSTRACT

A radio transmission system a base station comprises a plurality of transmitters arranged to transmit from the same site and having substantially the same output power, each transmitting on an individual channel within a dedicated block of contiguous channels. Receivers tuned to channels within said block of channels therefore require a limited image and adjacent channel rejection, of the order of 30 db. The receiver is preferably a direct conversion phasing receiver which has a local oscillator which can be tuned to a frequency within the block such that an image of any channel also falls within the block of channels. The system is suitable for local area radio systems such as paging or cordless telephones.

5 Claims, 1 Drawing Sheet

RADIO TRANSMISSION SYSTEM PROVIDING ADJACENT CHANNEL AND IMAGE FREQUENCY REJECTION

BACKGROUND OF THE INVENTION

1. Field of the Invention

The present invention relates to a radio transmission system which has particular application in local area radio systems such as paging or cordless telephones.

2. Description of the Prior Art

In many radio systems, transmitters are located at several sites with the result that a receiver receives at different field strengths signals in the selected channel as well as in adjacent channels. Consequently the receiver is constructed to provide image and adjacent channel rejection of the order of 70 dB or more which makes the receiver expensive.

SUMMARY OF THE INVENTION

An object of the present invention is to provide a radio transmission system which can tolerate the use of receivers with a lower degree of image and adjacent channel rejection.

According to the present invention there is provided a radio transmission system comprising transmitter means for transmitting with substantially equal powers a plurality of different signals in respective frequency channels from a single site, the frequency channels being contiguous and together forming a block of frequency channels, and at least one receiver tunable to any channel in said block.

By all the signal channels in a block of contiguous channels being transmitted from a single site at substantially equal powers, then the wanted and unwanted signals are at the same level and a limited degree, of the order of 30 dB, of adjacent channel rejection is adequate for acceptable reception.

If desired a receiver may have means for tuning its local oscillator to a frequency within the block of channels which produces an image within the block of channels. Because the wanted and image signals are at the same level and because the signals come from the same transmitter, a limited degree of image rejection (of the order of 30 dB) is adequate for acceptable performance.

BRIEF DESCRIPTION OF THE DRAWINGS

The present invention will now be described, by way of example, with reference to the accompanying drawings, wherein.

DESCRIPTION OF THE PREFERRED EMBODIMENTS

Figure 1:
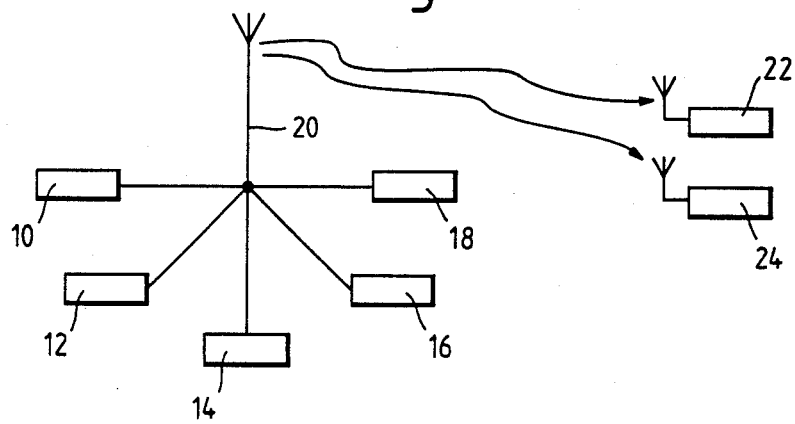
FIG. 1 is a diagram of an illustrative radio transmission system.

Referring to FIG. 1, the exemplary system comprises five transmitters 10, 12, 14, 16 and 18 connected to a single antenna 20 or to respective antennae located on the same site. One or more receivers 22, 24 are provided which may be fixedly sited or mobile. Each transmitter and receiver may, of course, be a transceiver.

In operation the transmitters 10 to 18 are allocated individual channels in a block 50 (FIG. 2) contiguous channels and each transmits its signal at substantially the same power as the (different) signals transmitted by the other transmitters. Thus at each receiver 22, 24 the transmitted signals are received at the same relative strength because there is a high degree of correlation in the path loss for signals separated in frequency by less than the auto-covariance bandwidth. However the strength of the signals received by any one receiver may be different from that experienced by other receivers. In any event since all the signals in the block of channels received by any one receiver are at the same level as the wanted channel then limited adjacent channel performance is acceptable. Consequently a lower performance specification receiver can be used to obtain this limited degree (about 30 dB) of rejection which is adequate for acceptable reception.

Figure 2:
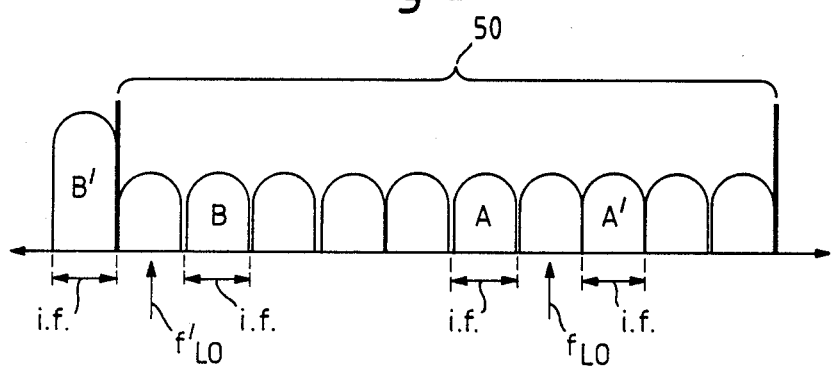
FIG. 2 is a spectrum diagram illustrating recovery of a broadcast radio frequency signal and its image.

When demodulating a signal it is necessary to distinguish a wanted signal from an unwanted image signal having the same i.f. This situation is illustrated in FIG. 2 where A is the wanted signal in the block 50 of channels and A' is the unwanted image signal as a result of the frequency difference between the local oscillator frequency $F_{LO}$ and A being the same as that between $F_{LO}$ and A'. In order to distinguish the wanted signal from its image, anti-image filtering can be implemented using direct conversion phasing receivers.

Figure 3:
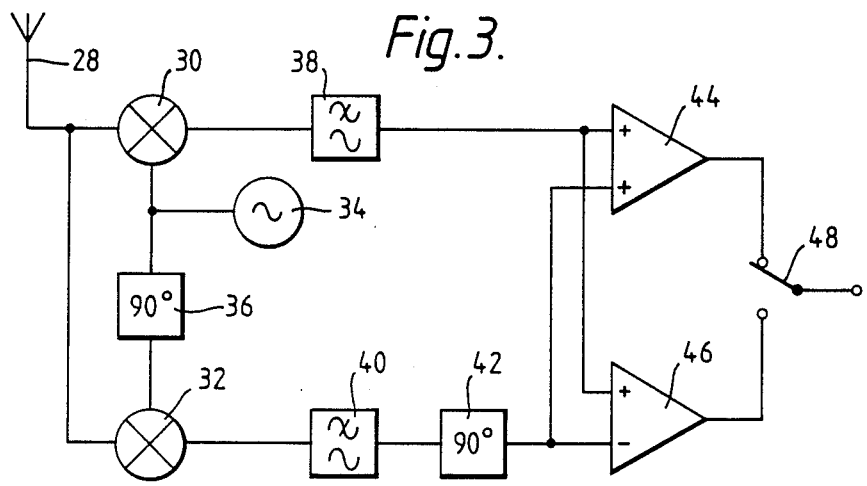
FIG. 3 is a block schematic circuit diagram of a low cost receiver for use in a radio transmission system in accordance with the present invention.

A suitable direct conversion phasing receiver is illustrated in FIG. 3. The receiver comprises first and second mixers 30, 32, each having an input coupled to an antenna 28. A local oscillator 34 is connected to the first mixer 30, and, via a 90 degree phase shifter 36, to the second mixer 32. The quadrature related signals at the outputs of the first and second mixers 30, 32 are filtered in low pass filters 38, 40 to obtain the i.f. signals which in fact may be at baseband. The signal from the filter 40 undergoes a further phase shift of 90 degrees in a phase shifter 42 so that a relative phase difference of either 0 degrees or of 180 degrees exists between the signals at the outputs of the filter 38 and the phase shifter 42. These signals are applied to summing and differencing amplifiers 44, 46 to recover the respective converted channel signals and the particular one is selected by means of a switch 48 which is connected to the summing amplifier 44 for a channel signal above $f_{LO}$ and to the differencing amplifier 46 for a channel signal below $f_{LO}$.

If desired the 90 degree phase shifter 36 could be arranged in the signal path to one or other of the first and second mixers 30, 32 and the low pass filters 38, 40 may be incorporated into their associated mixers 30, 32.

The local oscillator 34 may be implemented as a frequency synthesizer which can be controlled so as to utilise the block of channels more efficiently. Referring to FIG. 2, outside the block 50 of channels, signals may exist with significantly different field strengths. Thus in the case of selecting a signal, such as B, near the end of the block, there is a risk that the image B', lying outside the block 50, is much stronger and cannot be rejected satisfactorily in the receiver. One solution to this problem is not to transmit signals near the ends of the block 50 but this represents an inefficient use of the spectrum. A better solution is to program the frequency synthesizer so that it generates a local oscillator frequency to produce an image within the block. Consequently the channels at either end of the block 50 can be used. The preprogramming of the frequency synthesizer can be done in a number of ways. One is to store the identification of the problematic channels near the ends of the block and choose a suitable local oscillator frequency (or divider number) to obtain an image within the block. Another way is to determine the center frequency of the block 50 and program the frequency synthesizer so that for a channel below the center frequency the local oscillator frequency is higher than the carrier frequency of the selected channel and for a channel above the center frequency the local oscillator frequency is lower than the carrier frequency of the selected channel.

We claim:

1. A receiver for use in a radio transmission system in which a plurality of radio signals are transmitted from a single site in respective frequency channels and at substantially equal power levels, the frequency channels being contiguous and together forming a block of frequency channels; said receiver comprising:

an oscillator tunable to any selected channel in said block by producing a local signal at a frequency corresponding to that of such selected channel;

a mixer coupled to said oscillator for combining a received signal in said selected channel with said oscillator signal so as to convert the frequency band of such channel signal to a lower frequency band, said mixer also converting the frequency band of a received signal which is an image of said channel signal to said lower frequency band, such converted image signal being an image of the converted channel signal relative to the frequency of said oscillator;

filter means coupled to said mixer for rejecting converted signals produced by said mixer which are outside said lower frequency band; and signal combining means coupled to said filter means for rejecting said converted image signal and having an output at which it produces said converted channel signal;

said local oscillator producing said local signal at a frequency such that the image of said channel signal is at a frequency which is the same as that of another of the channels in said block, whereby the image of any channel signal in said block will always be in another channel in said block and so will be rejected by said signal combining means.

2. A receiver as claimed in claim 1, wherein the receiver has at least 30 dB adjacent channel rejection.

3. A receiver as claimed in claim 1, wherein the receiver is a direct conversion phasing receiver.

4. A receiver as claimed in claim 1, in which the local oscillator produces said local signal at a frequency below that of a channel to which it is tuned when such channel is closer to the upper edge of the block, and produces said local signal at a frequency above that of a channel to which it is tuned when such channel is closer to the lower edge of the block.

5. A receiver as claimed in claim 1, in which said signal combining means comprises: a second mixer and phase shifting means coupled to each of said mixers for deriving in-phase and phase-opposed frequency converted signals from a received signal in any channel; means coupled to said phase shifting means for deriving the sum and the difference of such in-phase and phase-opposed signals; and switching means coupled to said sum and difference deriving means for selecting the sum of the in-phase and phase-opposed signals when said oscillator is tuned to a channel at the upper edge of said block and for selecting the difference of the in-phase and phase-opposed signals when said oscillator is tuned to a channel at the lower edge of said block.

* * * * *